Jan. 16, 1934.   A. H. COWLES   1,943,786
PROCESS OF SEPARATING ALUMINA FROM ALKALI METAL ALUMINATE SOLUTIONS
Filed Oct. 10, 1930
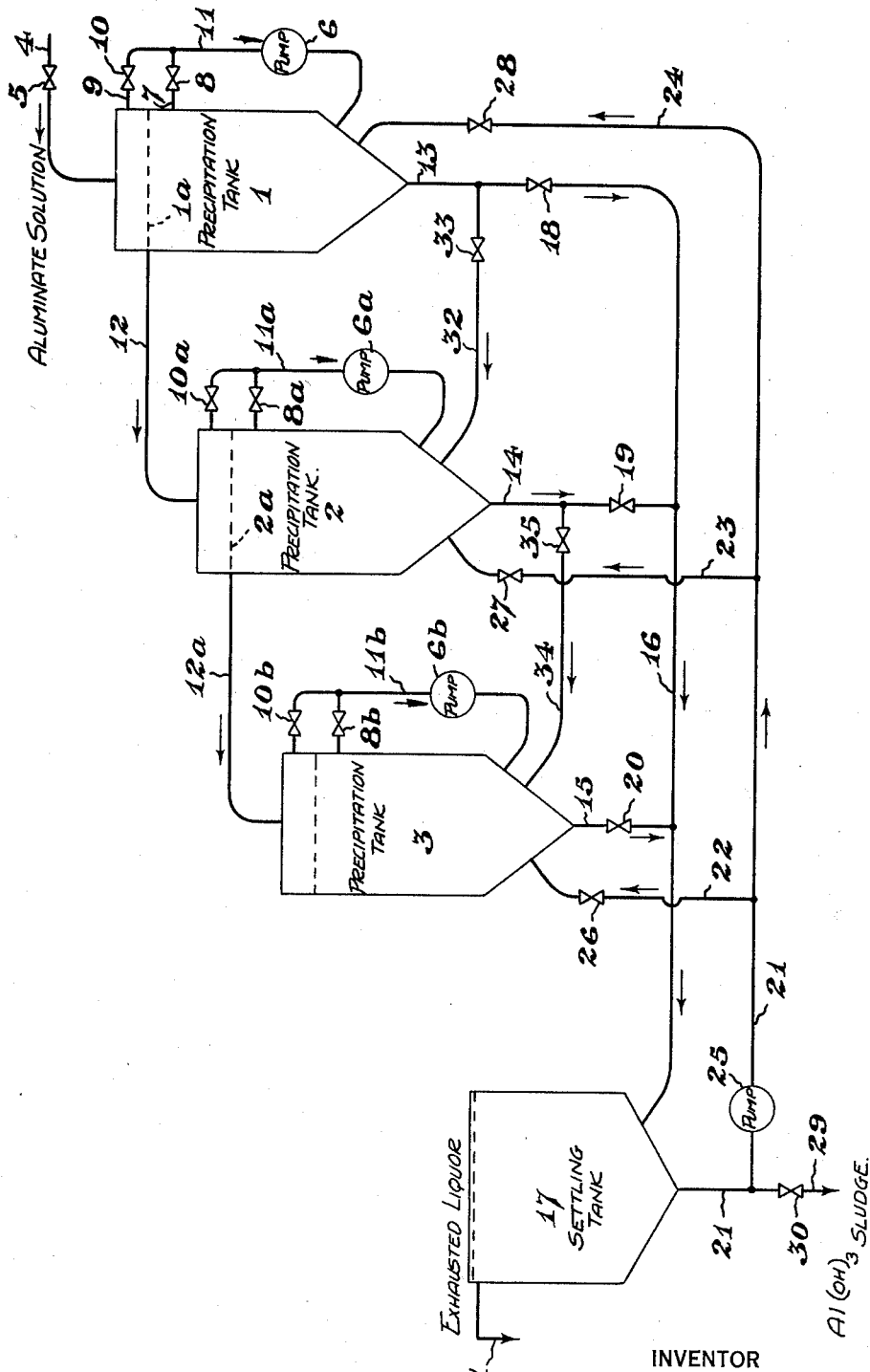
INVENTOR
Alfred H. Cowles, Deceased
by Evarts L. Prentiss, Exec.
By Evans & McCoy
ATTORNEYS Patented Jan. 16, 1934

1,943,786

UNITED STATES PATENT OFFICE 1,943,786

PROCESS OF SEPARATING ALUMINA FROM ALKALI METAL ALUMINATE SOLUTIONS

Alfred H. Cowles, deceased, late of Sewaren, N. J., by Evarts Lincoln Prentiss, executor, Brooklyn, N. Y., assignor to The Electric Smelting & Aluminum Company, Cleveland, Ohio, a corporation of Ohio Application October 10, 1930. Serial No. 487,756

14 Claims. (Cl. 23—143)

This invention relates to a process of precipitating and separating alumina hydrate particles or crystals from aqueous solutions of alkali metal aluminates, and is a continuation-in-part of application Serial No. 317,665, filed November 6, 1928, for Process of separating alumina from definite alkali aluminate solutions.

An object of this invention is to carry on the precipitation of alumina hydrate particles in a simple and efficient manner, increase the rate of precipitation, and obtain a high yield of alumina hydrate from the alkali metal aluminate solution.

Another object of this invention is to control the precipitation of the alumina hydrate particles from alkali metal aluminates, particularly as to size, and prevent the formation of masses or agglutinations of particles which would occlude considerable liquor.

Another object of this invention is to retain the small alumina hydrate particles in the alkali metal aluminate solution, and to control the size of the particles by a simple and convenient, continuous process, whereby the particles are not removed from the precipitating solution until they have reached a substantially predetermined size.

Another object of this invention is to provide a continuous process for precipitating alumina hydrate particles which can be carried on in a very simple manner without causing objectionable foaming of the solution.

A further object is to provide a simple apparatus for conveniently carrying on my process continuously.

Another object of the invention is to increase the number of alumina hydrate particles present in the precipitation tank per unit volume of alkali metal aluminate solution to aid the growth and rate of precipitation of the alumina hydrate.

Another object is to secure in the precipitating tank a slow upward motion on which is superposed a more rapid agitating motion of small amplitude above the portion containing the settled coarse particles.

Another object of this invention is to produce gentle agitation of the solution in the precipitating tank to increase the rate of precipitation, to produce alumina hydrate particles of substantially uniform size, and to prevent treeing of the growing particles.

An additional object is to provide a process of precipitating alumina hydrate particles of substantially uniform size, which may be carried out by continuously adding fresh mother liquor to the system, and continuously withdrawing the liquor laden with alumina hydrate particles of the proper size.

Additional objects of the invention will be apparent to those skilled in the art from the description hereinafter given of illustrative embodiments of the invention shown in the accompanying drawing, showing a diagrammatic view of the apparatus.

In the diagram is shown a battery of closed, cascaded precipitation tanks 1, 2 and 3, into which a solution of alkali metal aluminate is supplied through pipe 4, the rate of flow of the solution being controlled by the valve 5.

A pump 6 is preferably arranged to withdraw the liquor from a point near the top of the liquid level in tank 1 through pipe 7 and regulating valve 8, and also to withdraw through pipe 9 and regulating valve 10 a suitable amount of air above the liquid level of the closed tank 1. The liquid and air pass through the common pipe 11 and through the pump 6, and are introduced into the tank at a lower level, preferably near the bottom of the tank, to cause the desired upward circulation of the liquid in the tank, as will be more fully explained hereinafter.

The tank 2 is disposed at a lower level than tank 1, so that the liquor in tank 1, the upper level of which is indicated at 1a, may overflow through the pipe 12 into the top of tank 2. Tank 2 is similarly provided with pump 6a and control valves 8a and 10a, and communicating pipe 11a, for similarly circulating the liquor and air in tank 2.

Tank 3 is disposed at a lower level than tank 2, so that the liquor in tank 2, the upper level of which is indicated at 2a, may overflow through the pipe 12a into the top of tank 3. Tank 3 is similarly provided with pump 6b and control valves 8b and 10b, and communicating pipe 11b, for circulating the liquor and air in tank 3.

From the bottoms of tanks 1, 2 and 3, respectively, discharge pipes 13, 14 and 15 lead to a common pipe 16 which leads into the settling tank 17, preferably near the bottom thereof, suitable valves 18, 19 and 20, respectively, being provided in the pipes 13, 14 and 15 for opening and closing the pipes. From the settling tank 17 is provided a return pipe 21 with suitable pipe connections 22, 23 and 24 to the tanks 3, 2 and 1, respectively, there being a suitable pump 25 for forcing liquid through the pipe 21 into the precipitation tanks.

Suitable valves 26, 27 and 28 are provided in the return pipes 22, 23 and 24, respectively, leading into tanks 3, 2 and 1.

From the settling tank 17 a discharge pipe 29 with a valve 30 is provided by which the precipitate and liquor collected in the settling tank may be withdrawn and the precipitate filtered and calcined, or otherwise treated, as desired.

At the top of the settling tank 17 is disposed a suitable overflow 31 through which spent liquor may be continuously withdrawn.

It will be seen from the precipitating system which is disclosed herein that the process may be carried on in many ways, dependent upon the results desired to be obtained. One method of carrying on the process will now be described.

In starting up the system a solution of alkali metal aluminate of suitable concentration is introduced into one or more of the precipitation tanks and the settling tank, and previously precipitated alumina hydrate particles may be added to seed the solution and start the precipitation, or the solution may be simply agitated until such seed particles form in the solution. Any alumina hydrate particles which may separate in the settling tank 17 may be returned by means of the pump 25 to the desired precipitation tank or tanks in order to increase the mass of seed particles in the precipitation tanks to the desired concentration.

Of course, if it be desired in the process of separation to further increase the mass per unit volume of alumina hydrate particles in the precipitation tanks, a portion of the solution from the bottom of the settling tank 17 which is being continuously withdrawn therefrom, and which contains a very high mass of such particles per unit volume of liquid, may be returned to the bottoms of one or more of the precipitation tanks.

The solution of alkali metal aluminate in the precipitation tanks is preferably continuously agitated by means of the pumps withdrawing fluid, that is, liquid and air, or liquid alone or air alone from the top of tanks and returning it to the bottom portions, as shown. The agitation caused by introducing liquid into the bottom of the precipitation tanks is readily controlled by adjustment of the valves and pumps.

Obviously the pumped material may be entirely liquid or entirely gaseous, according to the adjustment of the valves 8 and 10, or any desired proportion of air and solution may be pumped and circulated. The air bubbles will rise relatively rapidly in the precipitation tank and increase the agitation without causing foaming of the solution. The agitation caused by the introduction of air causes the particles to be exposed to fresh solution, and on account of the slow upward flow only such particles of alumina hydrate as have grown to be sufficiently large will settle to the bottom of the tank against this upward current and agitation.

By proper regulation of the liquid and air introduced at the bottom of the first precipitation tank, it will be seen that the growth of the alumina hydrate particles may be readily controlled, and the size to which they grow may be controlled. The agitation and upward current also increases the rate of growth because it constantly presents fresh mother liquor to the large mass of relatively fine particles precipitating in the solution.

Also, the upward current and agitation will prevent the particles growing together and treeing, which is objectionable, it being usually desired to obtain particles of uniform size for the reason that the filtering may be more readily carried out and less mother liquor will be occluded.

It will thus be seen that by this process the formation of objectionably large masses of adherent particles of alumina hydrate, with the attendant occlusion of the solution, is avoided, and that the particles may be grown to a substantially uniform size and to the size that is most desired commercially, which renders the washing and purifying of the particles more efficient and easier.

The upward current in the precipitation tank may be readily controlled to produce a continuous supply of homogeneous particles of alumina hydrate of substantially uniform mass, and without causing foaming of the solution, as frequently occurs in processes heretofore used in which the solution is sprayed from a point above the tank through the open air down into the tank.

It will be seen that the rate of precipitation is increased according to my process in the various tanks of the series because of the larger number of fine particles per unit volume of liquor in the precipitation tanks, due to the retention, to a large degree, of the finer particles in the precipitation tanks.

It will also be seen that in this process wherein a greater mass of seed particles per unit volume of solution is maintained in the precipitation tanks the precipitation and growth of the alumina hydrate particles is accelerated due to the well known seeding out principle.

For example, in tank 1 of the series the aluminum content of the solution is largely contained as an alkali metal aluminate, and the presence of previously precipitated alumina hydrate particles, according to the above principle, will cause the growth of such particles and the formation of numerous additional, fine alumina hydrate particles. Due to this principle there is a greater precipitation of the particles and an accelerated growth of the particles already present in the solution.

The presence of a larger mass of fine particles in the precipitation tanks is also due to the fact that treeing and growing together of these particles is prevented by agitation.

By thus increasing the mass per unit volume of the fine particles in the precipitation tanks it is not only possible to increase the rate of growth of the particles, but it also follows that the mother liquor will be exhausted more quickly of the alumina hydrate in solution as the solution progresses in the system toward the settling tank.

With the process herein disclosed it will be seen that the air that is used for causing increased agitation is used over and over again, as the air is taken from the tops of the closed precipitation tanks and returned with the liquid into the bottoms of the tanks. This is of decided advantage because any carbon dioxide that may have been in the air is quickly eliminated and the admission of further carbon dioxide is prevented.

In prior processes the carbon dioxide contained in the column of air through which the spray is passed is continually taken up by the liquor and added to the solution, forming sodium carbonate. The presence of sodium carbonate causes the alumina hydrate to be precipitated in a gelatinous form, which is undesirable, as the granular form which is produced by the growth of particles in the process described herein is preferred. As is well known, the gelatinous form of alumina hydrate is very difficult to separate and wash, and produces a fine form of alumina hydrate which is not usually desired.

As the particles of alumina hydrate grow to sufficient size, they sink through the solution to the bottom of the precipitation tanks, and are conducted continuously from the bottom of the precipitation tanks to the settling tank 17 through the pipes, as shown.

The fine particles have a tendency to remain in the upper portion of the precipitation tanks, and may overflow through the overflow pipe into the next succeeding precipitation tank. The fine particles which are carried over serve as nuclei for the growth of larger particles, and the proportion which is carried over from tank to tank can be controlled by the amount of flow to gain the condition which gives the best results.

The overflow from precipitation tank 1 flows by gravity into the top of precipitation tank 2, in which the same precipitating process may be carried on with the same methods of control as above described.

Similarly, the overflow from precipitation tank 2 flows into precipitation tank 3, in which the precipitation is carried on in the same manner.

It is obvious that any suitable number of precipitating tanks may be provided so that the mass of the finest particles of alumina hydrate are kept in the precipitation tanks at all times, and the particles which have grown to the desired size and can settle to the bottoms of the precipitation tanks are withdrawn to the settling tank.

It is obvious that according to the method described particles of alumina hydrate may be grown of uniform size in each of the precipitating tanks. However, if such uniformity of size is not desirable, the particles may be grown to a different size by changing the regulation of the upward current and agitation in any one tank.

Another method of carrying on the precipitation is to withdraw the solution with the particles of alumina hydrate suspended therein from precipitation tank 1 through pipe 32 and introduce it into the bottom of precipitation tank 2, there being a suitable valve 33 provided to control the rate of flow, and, similarly, withdrawing the solution from tank 2 through pipe 34 and introducing it into tank 3, valve 35 being provided to control the flow. In using this method of intra-tank or series circulation through the precipitation tanks valves 18 and 19 should be closed.

If the pump 6a for causing an upward current in precipitation tank 2 be operated to give a faster upward current than in tank 1, the size of the particles grown will be larger than those in tank 1 before they can settle down against the current of greater velocity. Similarly, if the pump 6b for causing agitation and upward current in precipitation tank 3 be operated to give a faster upward current in tank 3 than in tank 2, a similar increase in size of the particles grown will result.

In this mode of operation, with the circulating pumps driven at different speeds, it is obvious that the growth of the particles will be by stages. It will be seen, however, that even in the so-called "series operation" of the precipitation tanks which I have just described the circulation caused by the circulating pumps 6, 6a and 6b may be varied to cause the growth of the alumina hydrate particles to any desired size or of substantially the same size in each precipitation tank.

In the series operation of the precipitation tanks it will also be seen that the mass per unit volume of the alumina hydrate particles present in the solution increases from the first tank to the end tank of the series, so that in the last tank of the series there will be the greatest mass per unit volume of the particles in suspension to more completely precipitate the alumina in the alkali metal aluminate solution. This method of operation has the advantage of bringing the greater mass per unit volume of previously precipitated alumina in contact with the weakest solution to more quickly and efficiently promote the precipitation of alumina hydrate particles to the maximum amount of precipitation.

My process, accordingly, may be advantageously used to cause precipitation in progressive stages, the progressively exhausted solution meeting progressively larger particles, and in larger mass per unit volume. It is advantageous to have the stronger liquor contact with a relatively small volume of fine particles, to make less probable the formation of aggregations of crystals, and to have the rate of precipitation rapid at this stage. In this way rapid precipitation, the growth of particles to the desired size, and the maximum precipitation from the solution, are secured, inasmuch as the strong, fresh solution is contacted with the finest particles, and the progressively exhausted solution is contacted with larger particles in a higher mass per unit volume, and the nearly exhausted solution is contacted with the coarsest particles and in the highest mass per unit volume.

In carrying out the precipitation of alumina hydrate particles according to the processes described herein it will be noted that if there should be any fine particles of alumina hydrate in the overflow from the settling tank 17 these particles may be readily separated from the solution by any well known means, such as filtration, settling or the like, and returned to the precipitation tanks.

It will thus be seen that by the apparatus and methods of operation disclosed herein the alumina hydrate particles may be very efficiently grown to any desired predetermined size by a simple process in which the particles are not removed from the precipitating solution until they have reached the predetermined size.

It may also be noted that the method of precipitating and separating alumina hydrate particles from aqueous solutions of alkali metal aluminates disclosed herein is such that it promotes and accelerates the precipitation of such particles by taking advantage of the well known property of alumina particles to separate from alkali metal aluminate solutions under suitable conditions without the aid of any chemical reagent. Alkali metal aluminate solutions act as if they held an excess amount of alumina in a state of supersaturation, and according to the processes disclosed herein it is possible to continuously and automatically cause and control the precipitation and growth of alumina hydrate particles from the alkali metal aluminate solution.

It will also be seen that by the introduction of fresh alkali metal aluminate solution into the precipitation tank 1 a portion of such fresh solution will be carried by the circulation pump 6 through pipe 11 and reintroduced into the precipitation tank in the bottom portion, thus causing the fresh solution to pass through the highest mass per unit volume of alumina particles which are disposed in the bottom of the precipitation tank, due to the fact that such particles are settling there. The introduction of the fresh liquor into a solution having such a high mass per unit volume of alumina particles of course increases the rate of precipitation and is an advantage in the continuous process.

Similarly, in the other precipitation tanks the liquor is introduced at the top portions of these tanks, and some of this liquor is similarly circulated through the pump and circulation pipes and is introduced into the bottom portion of these precipitation tanks, where the highest mass per unit volume of alumina hydrate particles exists in such precipitation tanks.

It will be seen that in carrying out the process the precipitation tanks may be heated or cooled by suitable means such as heating or cooling coils, if desired, to control the temperature of the solution for the precipitation of the particles.

It is to be understood that the details of apparatus shown and described, and the particular process set forth, are presented for purposes of explanation and illustration, and that various modifications of such apparatus and process can be made and followed without departing from the invention as defined in the appended claims.

What is claimed is:

1. The process of separating alumina hydrate from an alkali metal aluminate solution, which comprises supplying such solution to a series of precipitation tanks, permitting the solution to overflow progressively throughout the series of tanks during precipitation, and withdrawing fluid from the upper portion of each tank and returning it to the bottom portion of the same tank by an independent circulating means, thereby causing agitation in the precipitation tanks.

2. The process of separating alumina hydrate from an alkali metal aluminate solution, which comprises supplying such solution to a series of precipitation tanks, permitting the solution to overflow progressively to the end tank of the series, causing a circulation of the solution in each tank by withdrawing a portion only of the solution from the upper portion of each precipitation tank and returning it to the bottom portion of the same tank, withdrawing a portion of the solution, together with the suspended alumina hydrate particles, from the precipitation tanks, and passing it into a settling tank, withdrawing solution containing a high mass of particles per unit volume of solution from the bottom of the settling tank, and returning a portion of this solution to the bottom portion of the precipitation tanks to promote further precipitation.

3. The process of separating alumina hydrate from an alkali metal aluminate solution, which comprises supplying such solution to a closed series of precipitation tanks, permitting the solution to overflow progressively to the end tank of the series, continuously withdrawing a portion of the solution together with the suspended alumina hydrate particles from the precipitation tanks and permitting it to settle in a settling tank, withdrawing solution containing a high mass of alumina hydrate particles per unit volume from the bottom of the settling tank and returning a portion of the solution to the bottom portions of the precipitation tanks, and continuously withdrawing a portion of the solution and air from the tops of the precipitation tanks and returning it to the bottom portions of the precipitation tanks.

4. The process of separating alumina hydrate from an alkali metal aluminate solution, which comprises introducing such solution into the upper portion of the precipitation tank, causing an upwardly directed flow of the solution within the precipitation tank by forcibly and selectively withdrawing a portion of the fluid from the top of the precipitation tank and injecting it into the bottom portion of said tank to oppose the tendency of the particles of alumina hydrate to settle in the tank until the particles become of sufficient mass to settle against such upwardly directed flow and collect in the bottom portion of the tank, and withdrawing the accumulating precipitate from the precipitation tank.

5. The process of separating almuina hydrate from an alkali metal aluminate solution which comprises introducing such solution into a closed precipitation tank, withdrawing air and solution from the top of the closed precipitation tank and injecting the same into the bottom portion thereof to cause agitation of the solution by the upward flow of the fluid, whereby the particles of alumina hydrate are grown to a sufficient predetermined size to settle downwardly against the upwardly directed flow of fluid.

6. The process of separating alumina hydrate from an alkali metal aluminate solution, which comprises introducing such solution into a series of precipitation tanks, maintaining an upwardly directed circulation in each of the precipitation tanks by withdrawing fluid from the top portions of the tanks and injecting it into the bottom portions of the tanks at a rate causing a slow upward flow in said tanks to promote and control the growth of alumina hydrate particles in the precipitation tanks, withdrawing from the bottom portions of each of the successive precipitation tanks preceding the end tank a portion of the solution, together with the alumina hydrate particles which have settled to the bottom portions of such tanks against the upward circulation therein, injecting the solution withdrawn from each such precipitation tank into the bottom portion of the next succeeding precipitation tank, and continuously withdrawing the solution from the end tank of the series of precipitation tanks and conveying it to a settling tank.

7. The process of separating alumina hydrate from an alkali metal aluminate solution which comprises introducing such solution into a series of closed precipitation tanks, maintaining an upwardly directed circulation in each of the precipitation tanks by withdrawing air and liquid from the tops of the closed precipitation tanks and injecting it into the bottom portions of the precipitation tanks to promote and control the growth of alumina hydrate particles in the precipitation tanks, permitting the solution to overflow progressively to the end tank of the series, withdrawing from the bottom portions of each of the successive precipitation tanks preceding the end tank, a portion of the solution together with the alumina hydrate particles which have settled to the bottom portion of such tanks against the upward circulation therein, injecting the solution withdrawn from each such precipitation tank into the bottom portion of the next succeeding precipitation tank, and continuously withdrawing solution from the end tank of the series and conveying it to a settling tank.

8. The process of separating alumina hydrate from an alkali metal aluminate solution, which comprises continuously supplying such solution to the top of a precipitation tank, continuously withdrawing a portion only of the solution from the top portion of the precipitation tank and introducing it into the bottom portion of the precipitation tank to cause the fresh solution to pass through the highest mass per unit volume of alumina particles in the precipitation tank and to cause agitation of the solution in the precipitation tank by the upward flow of the solution therein, whereby the fresh solution continuously passes through the region of the greatest density of the alumina hydrate particles in the tank and the rate of precipitation of the alumina hydrate particles is accelerated, and continuously withdrawing from the bottom portion of the tank, solution and the alumina hydrate particles which have been precipitated.

9. The process of precipitating aluminum hydrate from alkali metal aluminate solutions, which comprises continuously adding a strong fresh solution to a relatively large volume of a partially exhausted alkali metal aluminate solution in which is suspended fine particles of aluminum hydrate, whereby precipitation occurs, continuously removing a portion of the resulting solution to a relatively large volume of still more exhausted solution in which is suspended a larger relative mass per unit volume of coarser particles of aluminum hydrate, and thereby obtaining further precipitation of the aluminum hydrate.

10. The process of precipitating aluminum hydrate from alkali metal aluminate solutions, which comprises continuously adding a strong fresh solution to a relatively large volume of a partially exhausted alkali metal aluminate solution in which is suspended fine particles of aluminum hydrate, whereby precipitation occurs, continuously removing a portion of the resulting solution to a relatively large volume of still more exhausted solution in which is suspended a larger relative mass per unit volume of coraser particles of aluminum hydrate, and thereby obtaining further precipitation of the aluminum hydrate, and repeating said steps with increasingly exhausted bodies of solutions in which are suspended increasingly larger masses per unit volume of increasingly coarser particles, until substantial exhaustion of the precipitable aluminum hydrate has been obtained.

11. The method of precipitating aluminum hydrate from an alkali aluminate solution, which comprises providing a plurality of precipitating tanks, supplying aluminum hydrate particles to the first tank, together with the aluminate liquor to be precipitated, causing a slow upward recirculation in this tank, whereby fine particles will be prevented from falling to the bottom thereof, overflowing part of this solution to the second tank, recirculating the solution in this tank faster than in the first tank, whereby particles of larger size than in the first tank will be supported and kept from settling, repeating this process with succeeding tanks, the upward circulation in each tank being faster than in the preceding, whereby the progressively exhausted aluminate solution in the several tanks is caused to contact with progressively larger particles of aluminum hydrate.

12. The process of separating aluminum hydrate from an alkali metal aluminate solution, which comprises supplying such a solution to a series of precipitation tanks, permitting the solution to overflow progressively from the top of one tank to the top of the next tank throughout the series of tanks during precipitation, and withdrawing the solution and accumulated aluminum hydrate particles from the tanks and returning it to the bottoms of the precipitation tanks, thereby causing agitation in the several precipitation tanks.

13. The process of separating aluminum hydrate from an alkali metal aluminate solution, which comprises supplying such solution in a series of precipitation tanks, permitting the solution to overflow progressively from the top of one tank to the top of the adjacent tank to the end tank of the series, withdrawing a portion of the solution, together with the suspended aluminum hydrate particles, from the precipitation tanks, and passing it into a settling tank, withdrawing the solution containing a high mass of particles per unit volume of solution from the bottom of the settling tank, and returning a portion of this solution to the bottoms of the precipitation tanks to promote further precipitation.

14. The process of separating alumina hydrate from an alkali metal aluminate solution which comprises supplying such solution to a substantially closed precipitation tank having an air space located above the solution, withdrawing air from above the solution and introducing it at the bottom portion of the tank to cause an upward flow of air through the solution thereby causing agitation of the solution whereby alumina hydrate particles are precipitated and their growth promoted.

EVARTS LINCOLN PRENTISS,
*Executor of the Estate of Alfred H. Cowles, Deceased.*